United States Patent
Sun et al.

(10) Patent No.: US 10,235,340 B2
(45) Date of Patent: Mar. 19, 2019

(54) METHOD AND APPARATUS FOR CONTROLLING REACTIVE POWER OF GENERATOR IN POWER PLANT

(71) Applicant: Tsinghua University, Beijing (CN)

(72) Inventors: Hongbin Sun, Beijing (CN); Qinglai Guo, Beijing (CN); Bin Wang, Beijing (CN); Boming Zhang, Beijing (CN); Wenchuan Wu, Beijing (CN); Lei Tang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 568 days.

(21) Appl. No.: 14/858,861

(22) Filed: Sep. 18, 2015

(65) Prior Publication Data

US 2016/0087566 A1 Mar. 24, 2016

(30) Foreign Application Priority Data

Sep. 22, 2014 (CN) .......................... 2014 1 0487913

(51) Int. Cl.
- H02P 9/02 (2006.01)
- G06F 17/10 (2006.01)
- H02J 3/00 (2006.01)
- H02P 9/00 (2006.01)

(52) U.S. Cl.
CPC ................ G06F 17/10 (2013.01); H02J 3/00 (2013.01); H02P 9/00 (2013.01)

(58) Field of Classification Search
CPC ............... G06F 17/10; H02P 9/00; H02J 3/00

USPC .................. 700/287; 702/60; 703/2; 322/25; 327/601; 323/205; 290/44; 315/183, 315/194

See application file for complete search history.

(56) References Cited

U.S. PATENT DOCUMENTS

| 2004/0260488 | A1* | 12/2004 | Al-Hamrani | G05F 1/70 702/60 |
| 2006/0282239 | A1* | 12/2006 | Chu | H02J 3/36 703/2 |
| 2012/0193915 | A1* | 8/2012 | Liu | H02J 3/1885 290/44 |
| 2012/0248874 | A1* | 10/2012 | Pan | H02J 11/00 307/64 |

* cited by examiner

*Primary Examiner* — Bo Fan
(74) *Attorney, Agent, or Firm* — Houtteman Law LLC (57) ABSTRACT

A method and apparatus for controlling a reactive power of a generator in a power plant are provided. The method includes: S1, dividing a plurality of power plants into a plurality of plant-plant coordination groups; S2, dividing generators into a first generator and a second generator set; S3, calculating a deviation between a measured voltage and a preset voltage of a central bus; S4, comparing the deviation with a control dead band threshold; S5, establishing a reactive power tracking model if the deviation is greater than the control dead band threshold; S6, establishing a reactive power keeping model; and S7, obtaining sum reactive power adjustments of the generators according to the first reactive power adjustments and the second reactive power adjustments, and obtaining voltage adjustments of buses according to the sum reactive power adjustments.

13 Claims, 2 Drawing Sheets

METHOD AND APPARATUS FOR CONTROLLING REACTIVE POWER OF GENERATOR IN POWER PLANT

CROSS-REFERENCE TO RELATED APPLICATION

This application claims priority to and benefits of Chinese Patent Application Serial No. 201410487913.0, filed with the State Intellectual Property Office of P.R. China on Sep. 22, 2014, the entire content of which is incorporated herein by reference.

FIELD

The present disclosure relates to a power system operation and control field, and more particularly relates to a method for controlling a reactive power of a generator in a power plant and an apparatus for controlling a reactive power of a generator in a power plant.

BACKGROUND

The AVC (Automatic Voltage Control) master system running in the control center controls the reactive resources in the power system, and plays an important role in ensuring the security, high-quality and economical operation of the power system. The typical AVC master system includes the reactive optimization for the whole power system in the hour level and the subregion control decision in the minute level. In particle, according to the reactive optimization for the whole power system, the preset optimal voltages of the key buses can be obtained to provide the control objectives for the subregion control decision; and according to the subregion control decision, the adjustments of the reactive means can be adjusted to ensure each key bus to track the preset optimal voltages.

In the subregion control decision, the conventional AVC master system ensures the voltages of the key buses (specified artificially, hereinafter referred to as the central buses) of the power system to meet the optimized preset voltages. However, if the electrical contact between the two power plants is close (i.e. strong coupling), it is possible to make the unreasonable distribution of the two strong coupling power plants due to the requirements for the voltages, thus affecting the security and economical operation of the power system.

SUMMARY

Embodiments of the present disclosure seek to solve at least one of the problems existing in the related art to at least some extent.

A first objective of the present disclosure is to provide a method for controlling a reactive power of a generator in a power plant. With the method for controlling a reactive power of a generator in a power plant, a plurality of plant-plant coordination groups are established as a plurality of coordination units, and deviation indicators of the reactive power load rates of the plurality of plant-plant coordination groups are defined. If voltages of central buses are not suitable, a secondary coordination voltage control can be considered (i.e. the reactive power tracking model) to make the voltages of the central buses to track the preset optimal voltages and to maintain the deviation indicators of the reactive power load rates of the plurality of plant-plant coordination groups to meet control requirements.

A second objective of the present disclosure is to provide an apparatus for controlling a reactive power of a generator in a power plant.

A third objective of the present disclosure is to provide a computer readable storage medium.

According to a first aspect of the present disclosure, a method for controlling a reactive power of a generator in a power plant is provided. The method comprises the steps of: S1, dividing a plurality of power plants in a reactive power and voltage control subregion into a plurality of plant-plant coordination groups according to mutual coupling coefficients, in which each plant-plant coordination group comprises at least one power plant, and a mutual coupling coefficient of one power plant belonging to a plant-plant coordination group and another power plant belonging to the plant-plant coordination group is greater than or equal to a preset coefficient if the plant-plant coordination group comprises at least two power plants; S2, dividing generators in the reactive power and voltage control subregion into a first generator set participating in a reactive power redistribution in a reactive power and voltage control and a second generator set not participating in the reactive power redistribution according to the plurality of plant-plant coordination groups; S3, calculating a deviation between a measured voltage and a preset voltage of a central bus in the reactive power and voltage control subregion; S4, comparing the deviation with a control dead band threshold; S5, establishing a reactive power tracking model according to the plurality of plant-plant coordination groups, and obtaining first reactive power adjustments of the generators in the reactive power and voltage control subregion according to the reactive power tracking model, if the deviation is greater than the control dead band threshold; S6, establishing a reactive power keeping model according to the plurality of plant-plant coordination groups, the first generator set and the second generator set, and obtaining second reactive power adjustments of the generators in the reactive power and voltage control subregion according to the reactive power keeping model; S7, obtaining sum reactive power adjustments of the generators in the reactive power and voltage control subregion according to the second reactive power adjustments, or according to the first reactive power adjustments and the second reactive power adjustments, and obtaining voltage adjustments of high voltage side buses of the plurality of power plants according to the sum reactive power adjustments to control voltages of the high voltage side buses.

In some embodiments, a mutual coupling coefficient of a $i^{th}$ power plant and a $j^{th}$ power plant is calculated according to formula (1):

$$\lambda_{ij} = \frac{k_{ij}k_{ji}}{k_{ii}k_{jj}} \quad (1)$$

where $k_{ji}$ is a sensitivity of a variation of a reactive power of the $i^{th}$ power plant relative to a variation of a voltage of a high-voltage side bus of the $j^{th}$ power plant, $k_{ij}$ is a sensitivity of a variation of a reactive power of the $j^{th}$ power plant relative to a variation of a voltage of a high-voltage side bus of the $i^{th}$ power plant, $k_{ii}$ is a sensitivity of the variation of the reactive power of the $i^{th}$ power plant relative to the variation of the voltage of the high-voltage side bus of the $i^{th}$ power plant, $k_{jj}$ is a sensitivity of the variation of the reactive power of the $j^{th}$ power plant relative to the variation of the voltage of the high-voltage side bus of the $j^{th}$ power plant, $1 \leq i \leq M$, $1 \leq j \leq M$, M is a number of the plurality of power plants.

In some embodiments, S2 comprises: traversing the plurality of power plants, and partitioning generators of a power plant into the first generator set if a plant-plant coordination group corresponding the power plant comprises at least two power plants, and partitioning the generators of the power plant into the second generator set if the plant-plant coordination group corresponding the power plant comprises one power plant.

In some embodiments, the reactive power tracking model is established according to formula (2), $$\min_{\Delta Q_{g1}} \left\{ W_p \|V_p - V_p^{ref} + C_g \Delta Q_{g1}\|^2 + W_q \sum_{k=1}^{G} (L_k)^2 \right\} \quad (2)$$

$St.$ $|C_{vg}^y \Delta Q_{g1}| \leq \Delta V_g^{h,y}$ $\underline{V_g^y} \leq V_g^y + C_{vg}^y \Delta Q_{g1} \leq \overline{V_g^y}$ $\underline{V_p^m} \leq V_p^m + C_{pg}^m \Delta Q_{g1} \leq \overline{V_p^m}$ $\underline{Q_g^k} \leq Q_g^k + \Delta Q_g^k \leq \overline{Q_g^k}$ $-\varepsilon^q \leq L_k - L_w^A \leq \varepsilon^q$ where $\Delta Q_{g1}$ is a first reactive power adjustment vector representing the first reactive power adjustments, $V_p$ is a measured voltage vector of central buses in the reactive power and voltage control subregion, $V_p^{ref}$ is a preset voltage vector of the central buses, $C_g$ is a sensitivity vector of voltage variations of the central buses relative to the first reactive power adjustment vector, $W_p$ and $W_q$ are weight coefficient vectors, $L_k$ is a reactive power load rate of a $k^{th}$ generator, G is a number of the generators in the reactive power and voltage control subregion, $C_{vq}^y$ is a sensitivity vector of reactive powers of the generators in the reactive power and voltage control subregion relative to a voltage of a high-voltage side bus of a $y^{th}$ power plant, $1 \leq y \leq M$, $\Delta V_g^{h,y}$ is a maximum adjustment quantum for a single adjustment of the high-voltage side bus of the $y^{th}$ power plant; $\underline{V_g^y}$, $V_g^y$ and $\overline{V_g^y}$ represent a lower limit of the voltage of the high-voltage side bus of the $y^{th}$ power plant, a measured voltage of the high-voltage side bus of the $y^{th}$ power plant and an upper limit of the voltage of the high-voltage side bus of the $y^{th}$ power plant respectively; $C_{pg}^m$ is a sensitivity vector of the reactive powers of the generators in the reactive power and voltage control subregion relative to a voltage of a $m^{th}$ central bus, $1 \leq m \leq N1$, N1 is a number of the central buses in the reactive power and voltage control subregion, $\underline{V_p^m}$, $V_p^m$ and $\overline{V_p^m}$ represent a lower limit of the voltage of the $m^{th}$ central bus, a measured voltage of the $m^{th}$ central bus and an upper limit of the voltage of the $m^{th}$ central bus; $Q_g^k$, $\Delta Q_g^k$, $\underline{Q_g^k}$ and $\overline{Q_g^k}$ represent a current reactive power of the $k^{th}$ generator, an adjustment of a reactive power of the $k^{th}$ generator, a lower limit of a reactive power of the $k^{th}$ generator and an upper limit of the reactive power of the $k^{th}$ generator respectively; $\varepsilon^q$ is a dead band threshold of a reactive power load rate of each of the generators in the reactive power and voltage control subregion, $1 \leq w \leq N2$, N2 is a number of the plurality of plant-plant coordination groups, $L_w^A$ is an average load rate of a $w^{th}$ plant-plant coordination group corresponding to the $k^{th}$ generator; in which $L_k$ is calculated according to formula (2-1), $$L_k = \frac{Q_g^k + \Delta Q_g^k - \underline{Q_g^k}}{\overline{Q_g^k} - \underline{Q_g^k}}; \quad (2\text{-}1)$$

in which $L_w^A$ is calculated according to formula (2-2), $$L_w^A = \frac{\sum_{x \in \Omega_g^{d(w)}} Q_g^x + \sum_{x \in \Omega_g^{d(w)}} \Delta Q_g^x - \sum_{x \in \Omega_g^{d(w)}} \underline{Q_g^x}}{\sum_{x \in \Omega_g^{d(w)}} \overline{Q_g^x} - \sum_{x \in \Omega_g^{d(w)}} \underline{Q_g^x}} \quad (2\text{-}2)$$

where $\Omega_g^{d(w)}$ is a set of generators in the $w^{th}$ plant-plant coordination group, $Q_g^x$, $\Delta Q_g^x$, $\underline{Q_g^x}$ and $\overline{Q_g^x}$ represent a current reactive power of a $x^{th}$ generator in $\Omega_g^{d(w)}$, an adjustment of a reactive power of the $x^{th}$ generator in $\Omega_g^{d(w)}$, a lower limit of a reactive power of the $x^{th}$ generator in $\Omega_g^{d(w)}$ and an upper limit of the reactive power of the $x^{th}$ generator in $\Omega_g^{d(w)}$ respectively.

In some embodiments, the reactive power keeping model is established according to formula (3), $$\min_{\Delta Q_{g2}} \left\{ W_p \sum_{u \in C} (L_u - L_w^A)^2 + W_q \sum_{v \in NC} (\Delta Q_g^v)^2 \right\} \quad (3)$$

$St. \quad |C_{vg}^y \Delta Q_{g2}| \leq \Delta V_g^{h,y}$ $\underline{V_g^y} \leq V_g^y + C_{vg}^y \Delta Q_{g2} \leq \overline{V_g^y}$ $V_p^{m,set} - \varepsilon^v \leq V_p^m + C_{pg}^m \Delta Q_{g2} \leq V_p^{m,set} + \varepsilon^v$ $\underline{Q_g^k} \leq Q_g^k + \Delta Q_g^k \leq \overline{Q_g^k}$ where $\Delta Q_{g2}$ is a second reactive power adjustment vector representing the second reactive power adjustments, C is the first generator set, NC is the second generator set, $L_u$ is a reactive power load rate of a $u^{th}$ generator in the first generators set, $\Delta Q_g^v$ represents an adjustment of a reactive power of a $v^{th}$ generator in the second generator set, $\varepsilon^v$ is a dead band threshold of each central bus, $V_p^{m,set}$ is a preset voltage of the $m^{th}$ central bus; wherein $L_u$ is calculated according to formula (3-1), $$L_u = \frac{Q_g^u + \Delta Q_g^u - \underline{Q_g^u}}{\overline{Q_g^u} - \underline{Q_g^u}} \quad (3\text{-}1)$$

where $Q_g^u$, $\overline{Q_g^u}$ and $\underline{Q_g^u}$ represent a current reactive power of the $u^{th}$ generator, a lower limit of a reactive power of the $u^{th}$ generator and an upper limit of the reactive power of the $u^{th}$ generator respectively.

In some embodiments, S7 comprises: obtaining a sum reactive power adjustment vector $\Delta Q_g$ according to formula (4), $$\Delta Q_g = \Delta Q_{g1} + \Delta Q_{g2} \quad (4)$$

obtaining a voltage adjustment vector $\Delta V_g$ according to formula (5), $$\Delta V_g = S_{vq} \Delta Q_g \quad (5)$$

where $S_{vq}$ is a sensitivity vector of reactive power adjustments of the generators in the reactive power and voltage control subregion relative to voltage adjustments of the high-voltage side buses of the plurality of power plants; sending each voltage adjustment of the voltage adjustment vector to a corresponding power plant as a voltage control instruction to perform the reactive power and voltage control.

According to a second aspect of the present disclosure, an apparatus for controlling a reactive power of a generator in a power plant is provided. The apparatus comprises:

a processor; and a memory for storing instructions executable by the processor, in which the processor is configured to:

divide a plurality of power plants in a reactive power and voltage control subregion into a plurality of plant-plant coordination groups according to mutual coupling coefficients, in which each plant-plant coordination group comprises at least one power plant, and a mutual coupling coefficient of one power plant belonging to a plant-plant coordination group and another power plant belonging to the plant-plant coordination group is greater than or equal to a preset coefficient if the plant-plant coordination group comprises at least two power plants;

divide generators in the reactive power and voltage control subregion into a first generator set participating in a reactive power redistribution in a reactive power and voltage control and a second generator set not participating in the reactive power redistribution according to the plurality of plant-plant coordination groups;

calculate a deviation between a measured voltage and a preset voltage of a central bus in the reactive power and voltage control subregion;

compare the deviation with a control dead band threshold;

establish a reactive power tracking model according to the plurality of plant-plant coordination groups, and obtain first reactive power adjustments of the generators in the reactive power and voltage control subregion according to the reactive power tracking model, if the deviation is greater than the control dead band threshold;

establish a reactive power keeping model according to the plurality of plant-plant coordination groups, the first generator set and the second generator set, and obtain second reactive power adjustments of the generators in the reactive power and voltage control subregion according to the reactive power keeping model;

obtain sum reactive power adjustments of the generators in the reactive power and voltage control subregion according to the second reactive power adjustments, or according to the first reactive power adjustments and the second reactive power adjustments, and obtain voltage adjustments of high voltage side buses of the plurality of power plants according to the sum reactive power adjustments to control voltages of the high voltage side buses.

According to a third aspect of the present disclosure, a computer readable storage medium is provided. The computer readable storage medium comprises a computer program for executing the method for controlling a reactive power of a generator in a power plant according to the first aspect of the present disclosure.

With the method or apparatus for controlling a reactive power of a generator in a power plant according to embodiments of the present disclosure, a plurality of plant-plant coordination groups are established as a plurality of coordination units, and deviation indicators of the reactive power load rates of the plurality of plant-plant coordination groups are defined. If voltages of central buses are not suitable, a secondary coordination voltage control can be considered (i.e. the reactive power tracking model) to make the voltages of the central buses to track the preset optimal voltages and to maintain the deviation indicators of the reactive power load rates of the plurality of plant-plant coordination groups to meet control requirements; if the voltages of the central buses are suitable, reactive correction control can be considered (i.e. the reactive power keeping model) to reduce the deviation indicators of the reactive power load rates of the plurality of plant-plant coordination groups and to ensure that the voltages of the central buses are maintained within the dead band thresholds. With the method or apparatus for controlling a reactive power of a generator in a power plant according to embodiments of the present disclosure, which can be integrated in the AVC master system for running in the dispatching center of the power system, according to the real-time operation of the power system and the reactive power distributions of power plants, the most appropriate subregion control decision may be implemented to coordinate the operation of the AVC sub system of the strong coupling coordination power plant, to reduce effectively the unreasonable reactive power distributions of the strong coupling power plants, and to meet the requirements of security, high-quality and economical control in the power system.

The above summary of the present disclosure is not intended to describe each disclosed embodiment or every implementation of the present disclosure. The Figures and the detailed descriptions which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the following, a method for controlling a reactive power of a generator in a power plant according to embodiments of the present disclosure will be described in detail with reference to the drawings.

Figure 1:
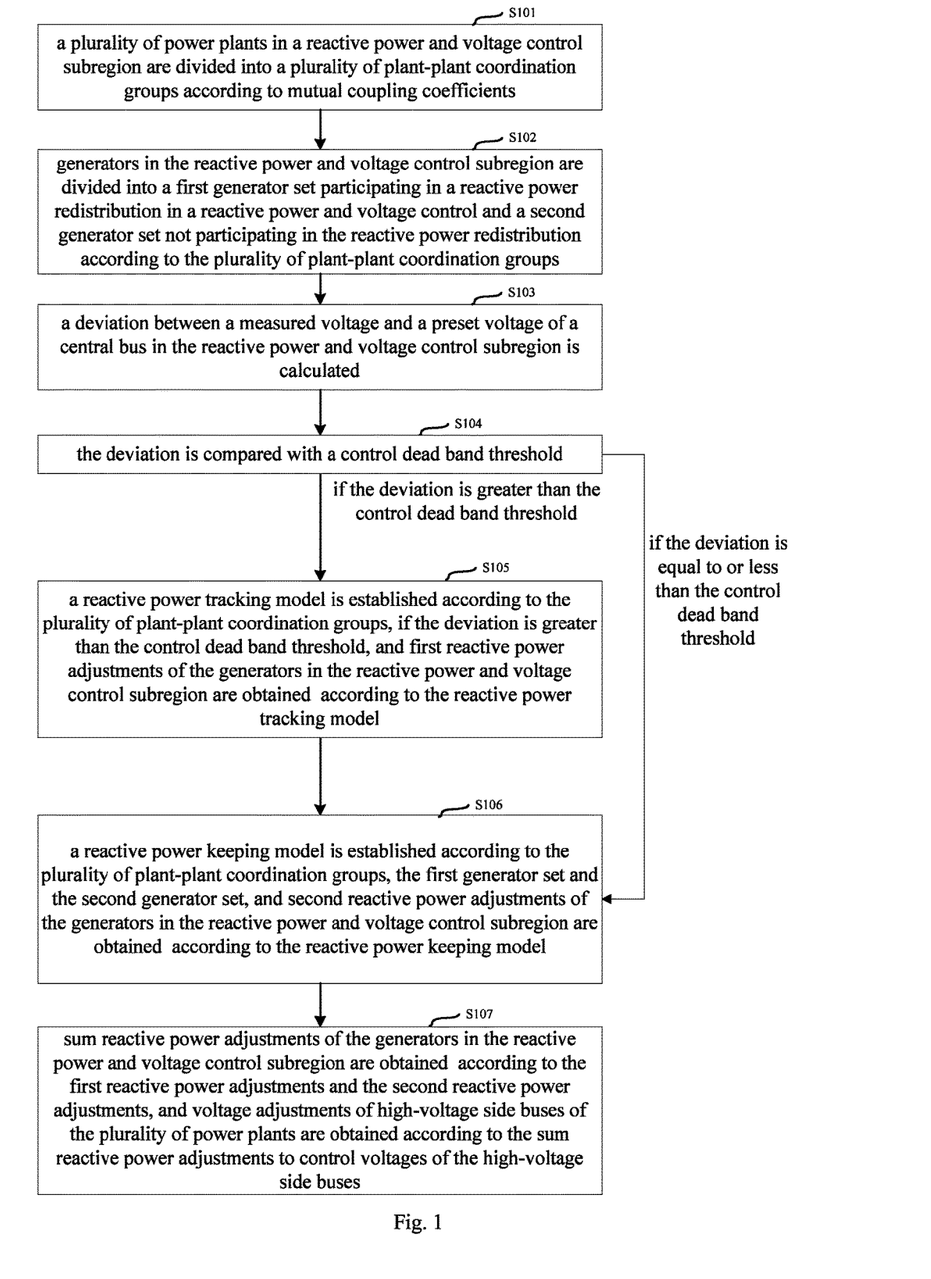
FIG. 1 is a flow chart of a method for controlling a reactive power of a generator in a power plant according to an embodiment of the present disclosure.

FIG. 1 is a flow chart of a method for controlling a reactive power of a generator in a power plant according to an embodiment of the present disclosure. As shown in FIG. 1, the method for controlling a reactive power of a generator in a power plant includes the following steps.

At step S101, a plurality of power plants in a reactive power and voltage control subregion are divided into a plurality of plant-plant coordination groups according to mutual coupling coefficients, in which each plant-plant coordination group includes at least one power plant, and a mutual coupling coefficient of one power plant belonging to a plant-plant coordination group and another power plant belonging to the plant-plant coordination group is greater than or equal to a preset coefficient if the plant-plant coordination group comprises at least two power plants.

Specifically, firstly, a mutual coupling coefficient of a $i^{th}$ power plant and a $j^{th}$ power plant is calculated according to formula (1):

$$\lambda_{ij} = \frac{k_{ij}k_{ji}}{k_{ii}k_{jj}} \quad (1)$$

where $k_{ji}$ is a sensitivity of a variation of a reactive power of the $i^{th}$ power plant relative to a variation of a voltage of a high-voltage side bus of the $j^{th}$ power plant, $k_{ij}$ is a sensitivity of a variation of a reactive power of the $j^{th}$ power plant relative to a variation of a voltage of a high-voltage side bus of the $i^{th}$ power plant, $k_{ii}$ is a sensitivity of the variation of the reactive power of the $i^{th}$ power plant relative to the variation of the voltage of the high-voltage side bus of the $i^{th}$ power plant, $k_{jj}$ is a sensitivity of the variation of the reactive power of the $j^{th}$ power plant relative to the variation of the voltage of the high-voltage side bus of the $j^{th}$ power plant, $1 \leq i \leq M$, $1 \leq j \leq M$, M is a number of the plurality of power plants. The sensitivity of the variation of the reactive power of a power plant relative to the variation of the voltage of the high-voltage side bus of another power plant (or the power plant) may be obtained from a dispatching center of the power system.

Secondly, a mutual coupling coefficients matrix $\lambda_d$ can be established as follow.

$$\lambda_d = \begin{pmatrix} \lambda_{11} & \cdots & \lambda_{1N} \\ \vdots & \ddots & \vdots \\ \lambda_{N1} & \cdots & \lambda_{NN} \end{pmatrix}$$

where N is a number of the power plants participating in a voltage control in a $d^{th}$ reactive power and voltage control subregion.

Finally, a preset coefficient $\lambda^{thr}$ can be set within the range of 0.1-0.5 (typically, $\lambda^{thr}$ can be set as 0.2), power plants in the power plant set $\Omega_g^d$ in the $d^{th}$ reactive power and voltage control subregion can be divided into the plurality of plant-plant coordination groups by performing a cluster analysis to enable the mutual coupling coefficient of any two power plants belonging to one of the plurality of plant-plant coordination groups is greater than or equal to the preset coefficient $\lambda^{thr}$, and the mutual coupling coefficient of any two power plants belonging to two different plant-plant coordination groups is less than the preset coefficient $\lambda^{thr}$. And then each plant-plant coordination group can be numbered with a serial number.

At step S102, generators in the reactive power and voltage control subregion are divided into a first generator set participating in a reactive power redistribution in a reactive power and voltage control and a second generator set not participating in the reactive power redistribution according to the plurality of plant-plant coordination groups.

In some embodiments, firstly, the plurality of power plants are traversed, and then generators of one of a power plant are partitioned into the first generator set if a plant-plant coordination group corresponding the power plant includes at least two power plants, and the generators of the power plant are partitioned into the second generator set if the plant-plant coordination group corresponding the power plant includes only one power plant. For example, the first generator set is defined as NC, and the second generator set is defined as C.

At step S103, a deviation between a measured voltage and a preset voltage of a central bus in the reactive power and voltage control subregion is calculated.

In some embodiments, the measured voltage and the preset voltage of the central bus in the reactive power and voltage control subregion can be obtained from the dispatching center of the power system.

At step S104, the deviation is compared with a control dead band threshold.

At step S105, a reactive power tracking model is established according to the plurality of plant-plant coordination groups, and first reactive power adjustments of the generators in the reactive power and voltage control subregion are obtained according to the reactive power tracking model, if the deviation is greater than the control dead band threshold.

In some embodiments, the reactive power tracking model is established according to formula (2), $$\min_{\Delta Q_{g1}} \left\{ W_p \| V_p - V_p^{ref} + C_g \Delta Q_{g1} \|^2 + W_q \sum_{k=1}^{G} (L_k)^2 \right\} \quad (2)$$

$$St. \quad |C_{vg}^y \Delta Q_{g1}| \leq \Delta V_g^{h,y}$$

$$\underline{V_g^y} \leq V_g^y + C_{vg}^y \Delta Q_{g1} \leq \overline{V_g^y}$$

$$\underline{V_p^m} \leq V_p^m + C_{pg}^m \Delta Q_{g1} \leq \overline{V_p^m}$$

$$\underline{Q_g^k} \leq Q_g^k + \Delta Q_g^k \leq \overline{Q_g^k}$$

$$-\varepsilon^q \leq L_k - L_w^A \leq \varepsilon^q$$

where $\Delta Q_{g1}$ is a first reactive power adjustment vector representing the first reactive power adjustments, $V_p$ is a measured voltage vector of central buses in the reactive power and voltage control subregion, $V_p^{ref}$ is a preset voltage vector of the central buses, $C_g$ is a sensitivity vector of voltage variations of the central buses relative to the first reactive power adjustment vector, $W_p$ and $Q_q$ are weight coefficient vectors, the range of $W_p$ is 5-20, typically, $W_p$ may be set as 10, the range of $W_q$ is 0.01-0.02, typically, $W_q$ may be set as 0.01, $L_k$ is a reactive power load rate of a $k^{th}$ generator, G is a number of the generators in the reactive power and voltage control subregion, $C_{vq}^y$ is a sensitivity vector of reactive powers of the generators in the reactive power and voltage control subregion relative to a voltage of a high-voltage side bus of a $y^{th}$ power plant, $1 \leq y \leq M$, $\Delta V_g^{h,y}$ is a maximum adjustment quantum for a single adjustment of the high-voltage side bus of the $y^{th}$ power plant, the range of $\Delta V_g^{h,y}$ is 1.0-2.0 kV; $\underline{V_g^y}$, $V_g^y$ and $\overline{V_g^y}$ represent a lower limit of the voltage of the high-voltage side bus of the $y^{th}$ power plant, a measured voltage of the high-voltage side bus of the $y^{th}$ power plant and an upper limit of the voltage of the high-voltage side bus of the $y^{th}$ power plant respectively; $C_{pg}^m$ is a sensitivity vector of the reactive powers of the generators in the reactive power and voltage control subregion relative to a voltage of a $m^{th}$ central bus, $1 \leq m \leq N1$, N1 is a number of the central buses in the reactive power and voltage control subregion, $\underline{V_p^m}$, $V_p^m$ and $\overline{V_p^m}$ represent a lower limit of the voltage of the $m^{th}$ central bus, a measured voltage of the $m^{th}$ central bus and an upper limit of the voltage of the $m^{th}$ central bus; $Q_g^k$, $\Delta Q_g^k$, $\underline{Q_g^k}$ and $\overline{Q_g^k}$ represent a current reactive power of the $k^{th}$ generator, an adjustment of a reactive power of the $k^{th}$ generator, a lower limit of a reactive power of the $k^{th}$ generator and an upper limit of the reactive power of the $k^{th}$ generator respectively; $\varepsilon^q$ is a dead band threshold of a reactive power load rate of each of the generators in the reactive power and voltage control subregion, the range of $\varepsilon^q$ is 0.1-0.2, typically $\varepsilon^q$ may be set as 0.1, $1 \leq w \leq N2$, N2 is a number of the plurality of plant-plant coordination groups, $L_w^A$ is an average load rate of a $w^{th}$ plant-plant coordination group corresponding to the $k^{th}$ generator;

$L_k$ is calculated according to formula (2-1), $$L_k = \frac{Q_g^k + \Delta Q_g^k - \underline{Q_g^k}}{\overline{Q_g^k} - \underline{Q_g^k}}; \tag{2-1}$$

$L_w^A$ is calculated according to formula (2-2), $$L_w^A = \frac{\sum_{x \in \Omega_g^{d(w)}} Q_g^x + \sum_{x \in \Omega_g^{d(w)}} \Delta Q_g^x - \sum_{x \in \Omega_g^{d(w)}} \underline{Q_g^x}}{\sum_{x \in \Omega_g^{d(w)}} \overline{Q_g^x} - \sum_{x \in \Omega_g^{d(w)}} \underline{Q_g^x}} \tag{2-2}$$

where $\Omega_g^{d(w)}$ is a set of generators in the $w^{th}$ plant-plant coordination group, $Q_g^x$, $\Delta Q_g^x$, $\underline{Q_g^x}$ and $\overline{Q_g^x}$ represent a current reactive power of a $x^{th}$ generator in $\Omega_g^{d(w)}$, an adjustment of a reactive power of the $x^{th}$ generator in $\Omega_g^{d(w)}$, a lower limit of a reactive power of the $x^{th}$ generator in $\Omega_g^{d(w)}$ and an upper limit of the reactive power of the $x^{th}$ generator in $\Omega_g^{d(w)}$ respectively.

In some embodiments, the first reactive power adjustments of the generators in the reactive power and voltage control subregion are obtained by solving the reactive power tracking model according to an interior point method. And then step S106 is executed.

At step S106, a reactive power keeping model is established according to the plurality of plant-plant coordination groups, the first generator set and the second generator set, and second reactive power adjustments of the generators in the reactive power and voltage control subregion are obtained according to the reactive power keeping model.

In some embodiments, the reactive power keeping model is established according to formula (3), $$\min_{\Delta Q_{g2}} \left\{ W_p \sum_{u \in C} (L_u - L_w^A)^2 + W_q \sum_{v \in NC} (\Delta Q_g^v)^2 \right\} \tag{3}$$

$$St. \ |C_{vg}^y \Delta Q_{g2}| \leq \Delta V_g^{h,y}$$

$$\underline{V_g^y} \leq V_g^y + C_{vg}^y \Delta Q_{g2} \leq \overline{V_g^y}$$

$$V_p^{m,set} - \varepsilon^v \leq V_p^m + C_{pg}^m \Delta Q_{g2} \leq V_p^{m,set} + \varepsilon^v$$

$$\underline{Q_g^k} \leq Q_g^k + \Delta Q_g^k \leq \overline{Q_g^k}$$

where $\Delta Q_{g2}$ is a second reactive power adjustment vector representing the second reactive power adjustments, C is the first generator set, NC is the second generator set, $L_u$ is a reactive power load rate of a $u^{th}$ generator in the first generators set, $\Delta Q_g^v$ represents an adjustment of a reactive power of a $v^{th}$ generator in the second generator set, $\varepsilon^v$ is a dead band threshold of each central bus, $V_p^{m,set}$ is a preset voltage of the $m^{th}$ central bus; the range of $\varepsilon^v$ is 0.5-1.0 kV, typically, $\varepsilon^v$ may be set as 0.5 kV.

$L_u$ is calculated according to formula (3-1), $$L_u = \frac{Q_g^u + \Delta Q_g^u - \underline{Q_g^u}}{\overline{Q_g^u} - \underline{Q_g^u}} \tag{3-1}$$

where $Q_g^u$, $\underline{Q_g^u}$ and $\overline{Q_g^u}$ represent a current reactive power of the $u^{th}$ generator, a lower limit of a reactive power of the $u^{th}$ generator and an upper limit of the reactive power of the $u^{th}$ generator respectively.

In some embodiments, the second reactive power adjustments of the generators in the reactive power and voltage control subregion are obtained by solving the reactive power keeping model according to an interior point method.

At step S107, sum reactive power adjustments of the generators in the reactive power and voltage control subregion are obtained according to the second reactive power adjustments or according to the first reactive power adjustments and the second reactive power adjustments, and voltage adjustments of buses in high-voltage sides of the plurality of power plants are obtained according to the sum reactive power adjustments to control voltages of the buses in the high-voltage sides.

Specifically, firstly, a sum reactive power adjustment vector $\Delta Q_g$ is obtained according to formula (4), $$\Delta Q_g = \Delta Q_{g1} + \Delta Q_{g2} \tag{4}$$

If the deviation between a measured voltage and a preset voltage of a central bus in the reactive power and voltage control subregion is less than or equal to the control dead band threshold, the S105 is not executed. At this time, $\Delta Q_g$ is equal to $\Delta Q_{g2}$.

Secondly, a voltage adjustment vector $\Delta V_g$ is obtained according to formula (5), $$\Delta V_g = S_{vq} \Delta Q_g \tag{5}$$

where $S_{vq}$ is a sensitivity vector of reactive power adjustments of the generators in the reactive power and voltage control subregion relative to voltage adjustments of the high-voltage side buses of the plurality of power plants.

Finally, each voltage adjustment of the voltage adjustment vector is sent to a corresponding power plant as a voltage control instruction to perform the reactive power and voltage control.

The present disclosure also provides an apparatus for controlling a reactive power of a generator in a power plant. In the following, the apparatus for controlling a reactive power of a generator in a power plant according to embodiments of the present disclosure will be described in detail.

Figure 2:
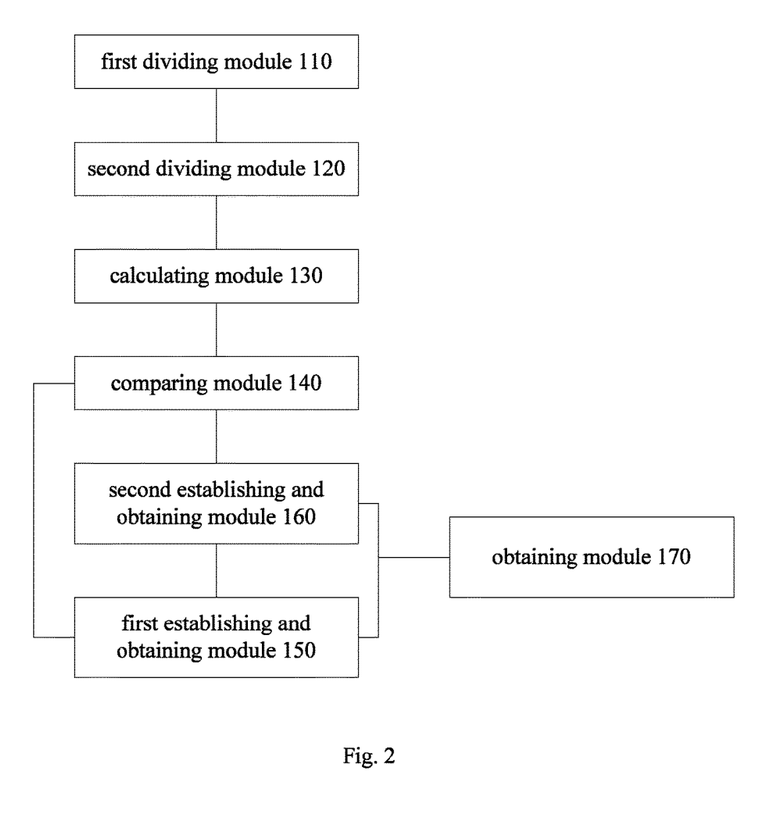
FIG. 2 is a schematic diagram of an apparatus for controlling a reactive power of a generator in a power plant according to an embodiment of the present disclosure.

FIG. 2 is a schematic diagram of an apparatus for controlling a reactive power of a generator in a power plant according to an embodiment of the present disclosure. As shown in FIG. 2, the apparatus includes a first dividing module 110, a second dividing module 120, a calculating module 130, a comparing module 140, a first establishing and obtaining module 150, a second establishing and obtaining module 160 and an obtaining module 170.

Specifically, the first dividing module 110 is configured to divide a plurality of power plants in a reactive power and voltage control subregion into a plurality of plant-plant coordination groups according to mutual coupling coefficients, in which each plant-plant coordination group comprises at least one power plant, and a mutual coupling coefficient of one power plant belonging to a plant-plant coordination group and another power plant belonging to the plant-plant coordination group is greater than or equal to a preset coefficient if the plant-plant coordination group comprises at least two power plants.

Specifically, firstly, in some embodiments, a mutual coupling coefficient of a $i^{th}$ power plant and a $j^{th}$ power plant is calculated according to formula (1):

$$\lambda_{ij} = \frac{k_{ij}k_{ji}}{k_{ii}k_{jj}} \quad (1)$$

where $k_{ji}$ is a sensitivity of a variation of a reactive power of the $i^{th}$ power plant relative to a variation of a voltage of a high-voltage side bus of the $j^{th}$ power plant, $k_{ij}$ is a sensitivity of a variation of a reactive power of the $j^{th}$ power plant relative to a variation of a voltage of a high-voltage side bus of the $i^{th}$ power plant, $k_{ii}$ is a sensitivity of the variation of the reactive power of the $i^{th}$ power plant relative to the variation of the voltage of the high-voltage side bus of the $i^{th}$ power plant, $k_{jj}$ is a sensitivity of the variation of the reactive power of the $j^{th}$ power plant relative to the variation of the voltage of the high-voltage side bus of the $j^{th}$ power plant, $1 \leq i \leq$, $1 \leq j \leq M$, M is a number of the plurality of power plants. The sensitivity of the variation of the reactive power of a power plant relative to the variation of the voltage of the high-voltage side bus of another power plant (or the power plant) may be obtained from a dispatching center of the power system.

Secondly, a mutual coupling coefficients matrix $\lambda_d$ can be established as follow.

$$\lambda_d = \begin{pmatrix} \lambda_{11} & \cdots & \lambda_{1N} \\ \vdots & \ddots & \vdots \\ \lambda_{N1} & \cdots & \lambda_{NN} \end{pmatrix}$$

where N is a number of the power plants participating in a voltage control in a $d^{th}$ reactive power and voltage control subregion.

Finally, a preset coefficient $\lambda^{thr}$ can be set within the range of 0.1-0.5 (typically, $\lambda^{thr}$ can be set as 0.2), power plants in the power plant set $\Omega_g^d$ in the $d^{th}$ reactive power and voltage control subregion can be divided into the plurality of plant-plant coordination groups by performing a cluster analysis to enable the mutual coupling coefficient of any two power plants belonging to one of the plurality of plant-plant coordination groups is greater than or equal to the preset coefficient $\lambda^{thr}$, and the mutual coupling coefficient of any two power plants belonging to two different plant-plant coordination groups is less than the preset coefficient $\lambda^{thr}$. And then each plant-plant coordination group can be numbered with a serial number.

The second dividing module 120 is configured to divide generators in the reactive power and voltage control subregion into a first generator set participating in a reactive power redistribution in a reactive power and voltage control and a second generator set not participating in the reactive power redistribution according to the plurality of plant-plant coordination groups.

In some embodiments, the second dividing module 120 further is configured to traverse the plurality of power plants, and to partition generators of a power plant into the first generator set if a plant-plant coordination group corresponding the power plant comprises at least two power plants, and to partition the generators of the power plant into the second generator set if the plant-plant coordination group corresponding the power plant includes only one power plant. For example, the first generator set is defined as NC, and the second generator set is defined as C.

The calculating module 130 is configured to calculate a deviation between a measured voltage and a preset voltage of a central bus in the reactive power and voltage control subregion.

In some embodiments, the measured voltage and the preset voltage of the central bus in the reactive power and voltage control subregion can be obtained from the dispatching center of the power system.

The comparing module 140 is configured to compare the deviation with a control dead band threshold.

The first establishing and obtaining module 150 is configured to establish a reactive power tracking model according to the plurality of plant-plant coordination groups, and to obtain first reactive power adjustments of the generators in the reactive power and voltage control subregion according to the reactive power tracking model, if the deviation is greater than the control dead band threshold.

In some embodiments, the reactive power tracking model is established according to formula (2), $$\min_{\Delta Q_{g1}} \left\{ W_p \|V_p - V_p^{ref} + C_g \Delta Q_{g1}\|^2 + W_q \sum_{k=1}^{G} (L_k)^2 \right\} \quad (2)$$

$$St. \ |C_{vg}^y \Delta Q_{g1}| \leq \Delta V_g^{h,y}$$

$$\underline{V_g^y} \leq V_g^y + C_{vg}^y \Delta Q_{g1} \leq \overline{V_g^y}$$

$$\underline{V_p^m} \leq V_p^m + C_{pg}^m \Delta Q_{g1} \leq \overline{V_p^m}$$

$$\underline{Q_g^k} \leq Q_g^k + \Delta Q_g^k \leq \overline{Q_g^k}$$

$$-\varepsilon^q \leq L_k - L_w^A \leq \varepsilon^q$$

where $\Delta Q_{g1}$ is a first reactive power adjustment vector representing the first reactive power adjustments, $V_p$ is a measured voltage vector of central buses in the reactive power and voltage control subregion, $V_p^{ref}$ is a preset voltage vector of the central buses, $C_g$ is a sensitivity vector of voltage variations of the central buses relative to the first reactive power adjustment vector, $W_p$ and $W_q$ are weight coefficient vectors, the range of $W_p$ is 5-20, typically, $W_p$ may be set as 10, the range of $W_q$ is 0.01-0.02, typically, $W_q$ may be set as 0.01, $L_k$ is a reactive power load rate of a $k^{th}$ generator, G is a number of the generators in the reactive power and voltage control subregion, $C_{vg}^y$ is a sensitivity vector of reactive powers of the generators in the reactive power and voltage control subregion relative to a voltage of a high-voltage side bus of a $y^{th}$ power plant, $1 \leq y \leq M$, $\Delta V_g^{h,y}$ is a maximum adjustment quantum for a single adjustment of the high-voltage side bus of the $y^{th}$ power plant, the range of $\Delta V_g^{h,y}$ is 1.0-2.0 kV; $\underline{V_g^y}$, $V_g^y$ and $\overline{V_g^y}$ represent a lower limit of the voltage of the high-voltage side bus of the $y^{th}$ power plant, a measured voltage of the high-voltage side bus of the $y^{th}$ power plant and an upper limit of the voltage of the high-voltage side bus of the $y^{th}$ power plant respectively; $C_{pg}^m$ is a sensitivity vector of the reactive powers of the generators in the reactive power and voltage control subregion relative to a voltage of a $m^{th}$ central bus, $1 \leq m \leq N1$, N1 is a number of the central buses in the reactive power and voltage control subregion, $\underline{V_p^m}$, $V_p^m$ and $\overline{V_p^m}$ represent a lower limit of the voltage of the $m^{th}$ central bus, a measured voltage of the $m^{th}$ central bus and an upper limit of the voltage of the $m^{th}$ central bus; $\underline{Q_g^k}$, $\Delta Q_g^k$, $\underline{Q_g^k}$ and $\overline{Q_g^k}$ represent a current reactive power of the $k^{th}$ generator, an adjustment of a reactive power of the $k^{th}$ generator, a lower limit of a reactive power of the $k^{th}$ generator and an upper limit of the reactive power of the $k^{th}$ generator respectively; $\varepsilon^q$ is a dead band threshold of a reactive power load rate of each of the generators in the reactive power and voltage control subregion, the range of $\varepsilon^q$ is 0.1-0.2, typically $\varepsilon^q$ may be set as 0.1, $1 \leq w \leq N2$, N2 is a number of the plurality of plant-plant coordination groups, $L_w^A$ is an average load rate of a $w^{th}$ plant-plant coordination group corresponding to the $k^{th}$ generator;

$L_k$ is calculated according to formula (2-1), $$L_k = \frac{Q_g^k + \Delta Q_g^k - \underline{Q_g^k}}{\overline{Q_g^k} - \underline{Q_g^k}}; \quad (2\text{-}1)$$

$L_w^A$ is calculated according to formula (2-2), $$L_w^A = \frac{\sum_{x \in \Omega_g^{d(w)}} Q_g^x + \sum_{x \in \Omega_g^{d(w)}} \Delta Q_g^x - \sum_{x \in \Omega_g^{d(w)}} \underline{Q_g^x}}{\sum_{x \in \Omega_g^{d(w)}} \overline{Q_g^x} - \sum_{x \in \Omega_g^{d(w)}} \underline{Q_g^x}} \quad (2\text{-}2)$$

where $\Omega_g^{d(w)}$ is a set of generators in the $w^{th}$ plant-plant coordination group, $Q_g^x$, $\Delta Q_g^x$, $\underline{Q_g^x}$ and $\overline{Q_g^x}$ represent a current reactive power of a $x^{th}$ generator in $\Omega_g^{d(w)}$, an adjustment of a reactive power of the $x^{th}$ generator in $\Omega_g^{d(w)}$, a lower limit of a reactive power of the $x^{th}$ generator in $\Omega_g^{d(w)}$ and an upper limit of the reactive power of the $x^{th}$ generator in $\Omega_g^{d(w)}$ respectively.

In some embodiments, the first reactive power adjustments of the generators in the reactive power and voltage control subregion are obtained by solving the reactive power tracking model according to an interior point method.

The second establishing and obtaining module 160 is configured to establish a reactive power keeping model according to the plurality of plant-plant coordination groups, the first generator set and the second generator set, and to obtain second reactive power adjustments of the generators in the reactive power and voltage control subregion according to the reactive power keeping model.

In some embodiments, the reactive power keeping model is established according to formula (3), $$\min_{\Delta Q_{g2}} \left\{ W_p \sum_{u \in C} (L_u - L_w^A)^2 + W_q \sum_{v \in NC} (\Delta Q_g^v)^2 \right\} \quad (3)$$

$$\text{S.t.} \quad |C_{vg}^y \Delta Q_{g2}| \leq \Delta V_g^{h,y}$$

$$\underline{V_g^y} \leq V_g^y + C_{vg}^y \Delta Q_{g2} \leq \overline{V_g^y}$$

$$V_p^{m,set} - \varepsilon^v \leq V_p^m + C_{pg}^m \Delta Q_{g2} \leq V_p^{m,set} + \varepsilon^v$$

$$\underline{Q_g^k} \leq Q_g^k + \Delta Q_g^k \leq \overline{Q_g^k}$$

where $\Delta Q_{g2}$ is a second reactive power adjustment vector representing the second reactive power adjustments, C is the first generator set, NC is the second generator set, $L_u$ is a reactive power load rate of a $u^{th}$ generator in the first generators set, $\Delta Q_g^v$ represents an adjustment of a reactive power of a $v^{th}$ generator in the second generator set, $\varepsilon^v$ is a dead band threshold of each central bus, $V_p^{m,set}$ is a preset voltage of the $m^{th}$ central bus; the range of $\varepsilon^v$ is 0.5-1.0 kV, typically, $\varepsilon^v$ may be set as 0.5 kV.

$L_u$ is calculated according to formula (3-1), $$L_u = \frac{Q_g^u + \Delta Q_g^u - \underline{Q_g^u}}{\overline{Q_g^u} - \underline{Q_g^u}} \quad (3\text{-}1)$$

where $Q_g^u$, $\overline{Q_g^u}$ and $\underline{Q_g^u}$ represent a current reactive power of the $u^{th}$ generator, a lower limit of a reactive power of the $u^{th}$ generator and an upper limit of the reactive power of the $u^{th}$ generator respectively.

In some embodiments, the second reactive power adjustments of the generators in the reactive power and voltage control subregion are obtained by solving the reactive power keeping model according to an interior point method.

The obtaining module 170 is configured to obtain sum reactive power adjustments of the generators in the reactive power and voltage control subregion according to the second reactive power adjustments or according to the first reactive power adjustments and the second reactive power adjustments, and to obtain voltage adjustments of high voltage side buses of the plurality of power plants according to the sum reactive power adjustments to control voltages of the high voltage side buses.

More specifically, the obtaining module 170 includes a first obtaining unit, a second obtaining unit and a sending unit (not shown in FIG. X).

The first obtaining unit is configured to obtain a sum reactive power adjustment vector $\Delta Q_g$ according to formula (4), $$\Delta Q_g = \Delta Q_{g1} + \Delta Q_{g2} \quad (4).$$

The second obtaining unit is configured to obtain a voltage adjustment vector $\Delta V_g$ according to formula (5), $$\Delta V_g = S_{vq} \Delta Q_g \quad (5)$$

where $S_{vq}$ is a sensitivity vector of reactive power adjustments of the generators in the reactive power and voltage control subregion relative to voltage adjustments of the high-voltage side buses of the plurality of power plants.

The sending unit is configured to send each voltage adjustment of the voltage adjustment vector to a corresponding power plant as a voltage control instruction to perform the reactive power and voltage control.

With the method or apparatus for controlling a reactive power of a generator in a power plant according to embodiments of the present disclosure, a plurality of plant-plant coordination groups are established as a plurality of coordination units, and deviation indicators of the reactive power load rates of the plurality of plant-plant coordination groups are defined. If voltages of central buses are not suitable, a secondary coordination voltage control can be considered (i.e. the reactive power tracking model) to make the voltages of the central buses to track the preset optimal voltages and to maintain the deviation indicators of the reactive power load rates of the plurality of plant-plant coordination groups to meet control requirements; if the voltages of the central buses are suitable, reactive correction control can be considered (i.e. the reactive power keeping model) to reduce the deviation indicators of the reactive power load rates of the plurality of plant-plant coordination groups and to ensure that the voltages of the central buses are maintained within the dead band thresholds. With the method or apparatus for controlling a reactive power of a generator in a power plant according to embodiments of the present disclosure, which can be integrated in the AVC master system for running in the dispatching center of the power system, according to the real-time operation of the power system and the reactive power distributions of power plants, the most appropriate subregion control decision may be implemented to coordinate the operation of the AVC sub system of the strong coupling coordination power plant, to reduce effectively the unreasonable reactive power distributions of the strong coupling power plants, and to meet the requirements of security, high-quality and economical control in the power system.

In the following, a computer readable storage medium according to embodiments of the present disclosure will be described in detail.

In some embodiments, the computer readable storage medium includes a computer program for executing the method for controlling a reactive power of a generator in a power plant according to the above embodiments of the present disclosure, when running on a computer.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling a reactive power of a generator in a power plant in a power system by using an Automatic Voltage Control system running in a control center of the power system, the Automatic Voltage Control system including at least one processor, comprising:
   S1, dividing, by the Automatic Voltage Control master system, a plurality of power plants in a reactive power and voltage control subregion into a plurality of plant-plant coordination groups S2, wherein each plant-plant coordination group comprises at least one power plant, and a mutual coupling coefficient of one power plant belonging to a plant-plant coordination group and another power plant belonging to the plant-plant coordination group is greater than or equal to a preset coefficient if the plant-plant coordination group comprises at least two power plants, wherein the preset coefficient is pre-set by the Automatic Voltage Control system;
   S2, dividing, by the Automatic Voltage Control master system, generators in the reactive power and voltage control subregion into a first generator set participating in a reactive power redistribution in a reactive power and voltage control and a second generator set not participating in the reactive power redistribution according to the plurality of plant-plant coordination groups;
   S3, calculating, by the Automatic Voltage Control master system, a deviation between a measured voltage and a preset voltage of a central bus in the reactive power and voltage control subregion, wherein the preset voltage of the central bus is pre-set by the Automatic Voltage Control system;
   S4, comparing, by the Automatic Voltage Control master system, the deviation with a control dead band threshold;
   S5, establishing a reactive power tracking model according to the plurality of plant-plant coordination groups, and obtaining first reactive power adjustments of the generators in the reactive power and voltage control subregion according to the reactive power tracking model, if the deviation is greater than the control dead band threshold;
   S6, establishing a reactive power keeping model according to the plurality of plant-plant coordination groups, the first generator set and the second generator set, and obtaining second reactive power adjustments of the generators in the reactive power and voltage control subregion according to the reactive power keeping model;
   S7, obtaining sum reactive power adjustments of the generators in the reactive power and voltage control subregion according to the second reactive power adjustments or according to the first reactive power adjustments and the second reactive power adjustments, obtaining voltage adjustments of high voltage side buses of the plurality of power plants according to the sum reactive power adjustments to control voltages of the high voltage side buses;
   S8, sending, by the Automatic Voltage Control master system, each voltage adjustment to a corresponding power plant as a voltage control instruction to perform the reactive and voltage control.

2. The method according to claim 1, wherein a mutual coupling coefficient of a $i^{th}$ power plant and a $j^{th}$ power plant is calculated according to formula (1):

$$\lambda_{ij} = \frac{k_{ij}k_{ji}}{k_{ii}k_{jj}} \quad (1)$$

where $k_{ij}$ is a sensitivity of a variation of a reactive power of the $i^{th}$ power plant relative to a variation of a voltage of a high-voltage side bus of the $j^{th}$ power plant, $k_{ji}$ is a sensitivity of a variation of a reactive power of the $j^{th}$ power plant relative to a variation of a voltage of a high-voltage side bus of the $i^{th}$ power plant, $k_{ii}$ is a sensitivity of the variation of the reactive power of the $i^{th}$ power plant relative to the variation of the voltage of the high-voltage side bus of the $i^{th}$ power plant, $k_{jj}$ is a sensitivity of the variation of the reactive power of the $j^{th}$ power plant relative to the variation of the voltage of the high-voltage side bus of the $j^{th}$ power plant, $1 \le i \le M$, $1 \le j \le M$, M is a number of the plurality of power plants.

3. The method according to claim 2, wherein S2 comprises:
   traversing the plurality of power plants, and partitioning generators of a power plant into the first generator set if a plant-plant coordination group corresponding the power plant comprises at least two power plants, and partitioning the generators of the power plant into the second generator set if the plant-plant coordination group corresponding the power plant comprises one power plant.

4. The method according to claim 3, wherein the reactive power tracking model is established according to formula (2), $$\min_{\Delta Q_{g1}} \left\{ W_p \| V_p - V_p^{ref} + C_g \Delta Q_{g1} \|^2 + W_q \sum_{k=1}^{G} (L_k)^2 \right\} \quad (2)$$

S.t. $|C_{vg}^y \Delta Q_{g1}| \le \Delta V_g^{h,y}$ $\underline{V_g^y} \le V_g^y + C_{vg}^y \Delta Q_{g1} \le \overline{V_g^y}$ $\underline{V_p^m} \le V_p^m + C_{pg}^m \Delta Q_{g1} \le \overline{V_p^m}$ $\underline{Q_g^k} \le Q_g^k + \Delta Q_g^k \le \overline{Q_g^k}$ $-\varepsilon^q \le L_k - L_w^A \le \varepsilon^q$ where $\Delta Q_{g1}$ is a first reactive power adjustment vector representing the first reactive power adjustments, $V_p$ is a measured voltage vector of central buses in the reactive power and voltage control subregion, $V_p^{ref}$ is a preset voltage vector of the central buses, $C_g$ is a sensitivity vector of voltage variations of the central buses relative to the first reactive power adjustment vector, $W_p$ and $W_q$ are weight coefficient vectors, $L_k$ is a reactive power load rate of a $k^{th}$ generator, G is a number of the generators in the reactive power and voltage control subregion, $C_{vg}{}^y$ is a sensitivity vector of reactive powers of the generators in the reactive power and voltage control subregion relative to a voltage of a high-voltage side bus of a $y^{th}$ power plant, $1 \leq y \leq M$, $\Delta V_g{}^{h,y}$ is a maximum adjustment quantum for a single adjustment of the high-voltage side bus of the $y^{th}$ power plant; $\underline{V_g^y}$, $V_g^y$ and $\overline{V_g^y}$ represent a lower limit of the voltage of the high-voltage side bus of the $y^{th}$ power plant, a measured voltage of the high-voltage side bus of the $y^{th}$ power plant and an upper limit of the voltage of the high-voltage side bus of the $y^{th}$ power plant respectively; $C_{pg}{}^m$ is a sensitivity vector of the reactive powers of the generators in the reactive power and voltage control subregion relative to a voltage of a $m^{th}$ central bus, $1 \leq m \leq N1$, N1 is a number of the central buses in the reactive power and voltage control subregion, $\underline{V_p^m}$, $V_p^m$ and $\overline{V_p^m}$ represent a lower limit of the voltage of the $m^{th}$ central bus, a measured voltage of the $m^{th}$ central bus and an upper limit of the voltage of the $m^{th}$ central bus; $Q_g^k$, $\Delta Q_g^k$, $\underline{Q_g^k}$ and $\overline{Q_g^k}$ represent a current reactive power of the $k^{th}$ generator, an adjustment of a reactive power of the $k^{th}$ generator, a lower limit of a reactive power of the $k^{th}$ generator and an upper limit of the reactive power of the $k^{th}$ generator respectively; $\varepsilon^q$ is a dead band threshold of a reactive power load rate of each of the generators in the reactive power and voltage control subregion, $1 \leq w \leq N2$, N2 is a number of the plurality of plant-plant coordination groups, $L_w^A$ is an average load rate of a $w^{th}$ plant-plant coordination group corresponding to the $k^{th}$ generator; wherein $L_k$ is calculated according to formula (2-1), $$L_k = \frac{Q_g^k + \Delta Q_g^k - \underline{Q_g^k}}{\overline{Q_g^k} - \underline{Q_g^k}}; \quad (2-1)$$

wherein $L_w^A$ is calculated according to formula (2-2), $$L_w^A = \frac{\sum_{x \in \Omega_g^{d(w)}} Q_g^x + \sum_{x \in \Omega_g^{d(w)}} \Delta Q_g^x - \sum_{x \in \Omega_g^{d(w)}} \underline{Q_g^x}}{\sum_{x \in \Omega_g^{d(w)}} \overline{Q_g^x} - \sum_{x \in \Omega_g^{d(w)}} \underline{Q_g^x}} \quad (2-2)$$

where $\Omega_g^{d(w)}$ is a set of generators in the $w^{th}$ plant-plant coordination group, $Q_g^x$, $\Delta Q_g^x$, $\underline{Q_g^x}$ and $\overline{Q_g^x}$ represent a current reactive power of a $x^{th}$ generator in $\Omega_g^{d(w)}$, an adjustment of a reactive power of the $x^{th}$ generator in $\Omega_g^{d(w)}$, a lower limit of a reactive power of the $x^{th}$ generator in $\Omega_g^{d(w)}$ and an upper limit of the reactive power of the $x^{th}$ generator in $\Omega_g^{d(w)}$ respectively.

5. The method according to claim 4, wherein the reactive power keeping model is established according to formula (3), $$\min_{\Delta Q_{g2}} \left\{ W_p \sum_{u \in C} (L_u - L_w^A)^2 + W_q \sum_{v \in NC} (\Delta Q_g^v)^2 \right\} \quad (3)$$

S.t. $|C_{vg}^y \Delta Q_{g2}| \leq \Delta V_g^{h,y}$ $\underline{V_g^y} \leq V_g^y + C_{vg}^y \Delta Q_{g2} \leq \overline{V_g^y}$ $V_p^{m,set} - \varepsilon^v \leq V_p^m + C_{pg}^m \Delta Q_{g2} \leq V_p^{m,set} + \varepsilon^v$ $\underline{Q_g^k} \leq Q_g^k + \Delta Q_g^k \leq \overline{Q_g^k}$ where $\Delta Q_{g2}$ is a second reactive power adjustment vector representing the second reactive power adjustments, C is the first generator set, NC is the second generator set, $L_u$ is a reactive power load rate of a $u^{th}$ generator in the first generators set, $\Delta Q_g^v$ represents an adjustment of a reactive power of a $v^{th}$ generator in the second generator set, $\varepsilon^v$ is a dead band threshold of each central bus, $V_p^{m,set}$ is a preset voltage of the $m^{th}$ central bus; wherein $L_u$ is calculated according to formula (3-1), $$L_u = \frac{Q_g^u + \Delta Q_g^u - \underline{Q_g^u}}{\overline{Q_g^u} - \underline{Q_g^u}} \quad (3-1)$$

where $Q_g^u$, $\underline{Q_g^u}$ and $\overline{Q_g^u}$ represent a current reactive power of the $u^{th}$ generator, a lower limit of a reactive power of the $u^{th}$ generator and an upper limit of the reactive power of the $u^{th}$ generator respectively.

6. The method according to claim 5, wherein S7 comprises:
obtaining a sum reactive power adjustment vector $\Delta Q_g$ representing the sum reactive power adjustments according to formula (4), $$\Delta Q_g = \Delta Q_{g1} + \Delta Q_{g2} \quad (4)$$

obtaining a voltage adjustment vector $\Delta V_g$ according to formula (5), $$\Delta V_g = S_{vg} \Delta Q_g \quad (5)$$

where $S_{vq}$ is a sensitivity vector of reactive power adjustments of the generators in the reactive power and voltage control subregion relative to voltage adjustments of the high-voltage side buses of the plurality of power plants;
sending each voltage adjustment of the voltage adjustment vector to a corresponding power plant as a voltage control instruction to perform the reactive power and voltage control.

7. An apparatus in an Automatic Voltage Control system running in a control center of a power system, for controlling a reactive power of a generator in a power plant, comprising:
a processor; and
a memory for storing instructions executable by the processor,
wherein the processor is configured to:
divide a plurality of power plants in a reactive power and voltage control subregion into a plurality of plant-plant coordination groups according to mutual coupling coefficients, wherein each plant-plant coordination group comprises at least one power plant, and a mutual coupling coefficient of one power plant belonging a plant-plant coordination group and another power plant belonging to the plant-plant coordination group is greater than or equal to a preset coefficient if the plant-plant coordination group comprises at least two power plants;
divide generators in the reactive power and voltage control subregion into a first generator set participating in a reactive power redistribution in a reactive power and voltage control and a second generator set not participating in the reactive power redistribution according to the plurality of plant-plant coordination groups;

calculate a deviation between a measured voltage and a preset voltage of a central bus in the reactive power and voltage control subregion;

compare the deviation with a control dead band threshold;

establish a reactive power tracking model according to the plurality of plant-plant coordination groups, and obtain first reactive power adjustments of the generators in the reactive power and voltage control subregion according to the reactive power tracking model, if the deviation is greater than the control dead band threshold;

establish a reactive power keeping model according to the plurality of plant-plant coordination groups, the first generator set and the second generator set, and obtain second reactive power adjustments of the generators in the reactive power and voltage control subregion according to the reactive power keeping model;

obtain sum reactive power adjustments of the generators in the reactive power and voltage control subregion according to the second reactive power adjustments, or according to the first reactive power adjustments and the second reactive power adjustments, and obtain voltage adjustments of high voltage side buses of the plurality of power plants according to the sum reactive power adjustments to control voltages of the high voltage side buses; and sending each voltage adjustment to a corresponding power plant as a voltage control instruction to perform the reactive and voltage control.

8. The apparatus according to claim 7, wherein a mutual coupling coefficient of a $i^{th}$ power plant and a $j^{th}$ power plant is calculated according to formula (1):

$$\lambda_{ij} = \frac{k_{ij}k_{ji}}{k_{ii}k_{jj}} \quad (1)$$

where $k_{ji}$ is a sensitivity of a variation of a reactive power of the $i^{th}$ power plant relative to a variation of a voltage of a high-voltage side bus of the $j^{th}$ power plant, $k_{ij}$ is a sensitivity of a variation of a reactive power of the $j^{th}$ power plant relative to a variation of a voltage of a high-voltage side bus of the $i^{th}$ power plant, $k_{ii}$ is a sensitivity of the variation of the reactive power of the $i^{th}$ power plant relative to the variation of the voltage of the high-voltage side bus of the $i^{th}$ power plant, $k_{jj}$ is a sensitivity of the variation of the reactive power of the $j^{th}$ power plant relative to the variation of the voltage of the high-voltage side bus of the $j^{th}$ power plant, $1 \leq i \leq M$, $1 \leq j \leq M$, M is a number of the plurality of power plants.

9. The apparatus according to claim 8, wherein the processor is configured to divide generators in the reactive power and voltage control subregion into a first generator set and a second generator set by a step of:

traversing the plurality of power plants, and partitioning generators of a power plant into the first generator set if a plant-plant coordination group corresponding the power plant comprises at least two power plants, and partitioning the generators of the power plant into the second generator set if the plant-plant coordination group corresponding the power plant comprises one power plant.

10. The apparatus according to claim 9, wherein the reactive power tracking model is established according to formula (2)

$$\min_{\Delta Q_{g1}} \left\{ W_p \|V_p - V_p^{ref} + C_g \Delta Q_{g1}\|^2 + W_q \sum_{k=1}^{G} (L_k)^2 \right\} \quad (2)$$

$$\text{S.t. } |C_{vg}^y \Delta Q_{g1}| \leq \Delta V_g^{h,y}$$

$$\underline{V_g^y} \leq V_g^y + C_{vg}^y \Delta Q_{g1} \leq \overline{V_g^y}$$

$$\underline{V_p^m} \leq V_p^m + C_{pg}^m \Delta Q_{g1} \leq \overline{V_p^m}$$

$$\underline{Q_g^k} \leq Q_g^k + \Delta Q_g^k \leq \overline{Q_g^k}$$

$$-\varepsilon^q \leq L_k - L_w^A \leq \varepsilon^q$$

where $\Delta Q_{g1}$ is a first reactive power adjustment vector representing the first reactive power adjustments, $V_p$ is a measured voltage vector of central buses in the reactive power and voltage control subregion, $V_p^{ref}$ is a preset voltage vector of the central buses, $C_g$ is a sensitivity vector of voltage variations of the central buses relative to the first reactive power adjustment vector, $W_p$ and $W_q$ are weight coefficient vectors, $L_k$ is a reactive power load rate of a $k^{th}$ generator, G is a number of the generators in the reactive power and voltage control subregion, $C_{vg}^y$ is a sensitivity vector of reactive powers of the generators in the reactive power and voltage control subregion relative to a voltage of a high-voltage side bus of a $y^{th}$ power plant, $1 \leq y \leq M$, $\Delta V_g^{h,y}$ is a maximum adjustment quantum for a single adjustment of the high-voltage side bus of the $y^{th}$ power plant; $\underline{V_g^y}$, $V_g^y$ and $\overline{V_g^y}$ represent a lower limit of the voltage of the high-voltage side bus of the $y^{th}$ power plant, a measured voltage of the high-voltage side bus of the $y^{th}$ power plant and an upper limit of the voltage of the high-voltage side bus of the $y^{th}$ power plant respectively; $C_{pg}^m$ is a sensitivity vector of the reactive powers of the generators in the reactive power and voltage control subregion relative to a voltage of a $m^{th}$ central bus, $1 \leq m \leq N1$, N1 is a number of the central buses in the reactive power and voltage control subregion, $\underline{V_p^m}$, $V_p^m$ and $\overline{V_p^m}$ represent a lower limit of the voltage of the $m^{th}$ central bus, a measured voltage of the $m^{th}$ central bus and an upper limit of the voltage of the $m^{th}$ central bus; $Q_g^k$, $\Delta Q_g^k$, $\underline{Q_g^k}$ and $\overline{Q_g^k}$ represent a current reactive power of the $k^{th}$ generator, an adjustment of a reactive power of the $k^{th}$ generator, a lower limit of a reactive power of the $k^{th}$ generator and an upper limit of the reactive power of the $k^{th}$ generator respectively; $\varepsilon^q$ is a dead band threshold of a reactive power load rate of each of the generators in the reactive power and voltage control subregion, $1 \leq w \leq N2$, N2 is a number of the plurality of plant-plant coordination groups, $L_w^A$ is an average load rate of a $w^{th}$ plant-plant coordination group corresponding to the $k^{th}$ generator; wherein $L_k$ is calculated according to formula (2-1), $$L_k = \frac{Q_g^k + \Delta Q_g^k - \underline{Q_g^k}}{\overline{Q_g^k} - \underline{Q_g^k}}; \quad (2-1)$$

wherein $L_w^A$ is calculated according to formula (2-2), $$L_w^A = \frac{\sum_{x \in \Omega_g^{d(w)}} Q_g^x + \sum_{x \in \Omega_g^{d(w)}} \Delta Q_g^x - \sum_{x \in \Omega_g^{d(w)}} \underline{Q_g^x}}{\sum_{x \in \Omega_g^{d(w)}} \overline{Q_g^x} - \sum_{x \in \Omega_g^{d(w)}} \underline{Q_g^x}} \quad (2\text{-}2)$$

where $\Omega_g^{d(w)}$ is a set of generators in the $w^{th}$ plant-plant coordination group, $Q_g^x$, $\Delta Q_g^x$, $\underline{Q_g^x}$ and $\overline{Q_g^x}$ represent a current reactive power of a $x^{th}$ generator in $\Omega_g^{d(w)}$, an adjustment of a reactive power of the $x^{th}$ generator in $\Omega_g^{d(w)}$, a lower limit of a reactive power of the $x^{th}$ generator in $\Omega_g^{d(w)}$ and an upper limit of the reactive power of the $x^{th}$ generator in $\Omega_g^{d(w)}$ respectively.

11. The apparatus according to claim 10, wherein the reactive power keeping model is established according to formula (3), $$\min_{\Delta Q_{g2}} \left\{ W_p \sum_{u \in C} (L_u - L_w^A)^2 + W_q \sum_{v \in NC} (\Delta Q_g^v)^2 \right\} \quad (3)$$

$$\text{S.t. } |C_{vg}^y \Delta Q_{g2}| \leq \Delta V_g^{h,y}$$

$$\underline{V_g^y} \leq V_g^y + C_{vg}^y \Delta Q_{g2} \leq \overline{V_g^y}$$

$$V_p^{m,set} - \varepsilon^v \leq V_p^m + C_{pg}^m \Delta Q_{g2} \leq V_p^{m,set} + \varepsilon^v$$

$$\underline{Q_g^k} \leq Q_g^k + \Delta Q_g^k \leq \overline{Q_g^k}$$

where $\Delta Q_{g2}$ is a second reactive power adjustment vector representing the second reactive power adjustments, C is the first generator set, NC is the second generator set, $L_u$ is a reactive power load rate of a $u^{th}$ generator in the first generators set, $\Delta Q_g^v$ represents an adjustment of a reactive power of a $v^{th}$ generator in the second generator set, $\varepsilon^v$ is a dead band threshold of each central bus, $V_p^{m,set}$ is a preset voltage of the $m^{th}$ central bus; wherein $L_u$ is calculated according to formula (3-1), $$L_u = \frac{Q_g^u + \Delta Q_g^u - \underline{Q_g^u}}{\overline{Q_g^u} - \underline{Q_g^u}} \quad (3\text{-}1)$$

where $Q_g^u$, $\underline{Q_g^u}$ and $\overline{Q_g^u}$ represent a current reactive power of the $u^{th}$ generator, a lower limit of a reactive power of the $u^{th}$ generator and an upper limit of the reactive power of the $u^{th}$ generator respectively.

12. The apparatus according to claim 11, wherein the processor is configured to obtain sum reactive power adjustments of the generators in the reactive power and voltage control subregion and obtain voltage adjustments of high voltage side buses of the plurality of power plants according to the sum reactive power adjustments to control voltages of the high voltage side buses by steps of:

obtaining a sum reactive power adjustment vector $\Delta Q_g$ representing the sum reactive power adjustments according to formula (4), $$\Delta Q_g \Delta Q_{g1} \Delta Q_{g2} \quad (4)$$

obtaining a voltage adjustment vector $\Delta V_g$ according to formula (5), $$\Delta V_g = S_{vq} \Delta Q_g \quad (5)$$

where $S_{vq}$ is a sensitivity vector of reactive power adjustments of the generators in the reactive power and voltage control subregion relative to voltage adjustments of the high-voltage side buses of the plurality of power plants;

sending each voltage adjustment of the voltage adjustment vector to a corresponding power plant as a voltage control instruction to perform the reactive power and voltage control.

13. A computer readable storage medium in an Automatic Voltage Control system running in a control center of the power system, the Automatic Voltage Control system including at least one processor, comprising a computer program for executing steps of:

S1, dividing a plurality of power plants in a reactive power and voltage control subregion into a plurality of plant-plant coordination groups according to mutual coupling coefficients, wherein each plant-plant coordination group comprises at least one power plant, and a mutual coupling coefficient of one power plant belonging to a plant-plant coordination group and another power plant belonging to the plant-plant coordination group is greater than or equal to a preset coefficient if the plant-plant coordination group comprises at least two power plants;

S2, dividing generators in the reactive power and voltage control subregion into a first generator set participating in a reactive power redistribution in a reactive power and voltage control and a second generator set not participating in the reactive power redistribution according to the plurality of plant-plant coordination groups;

S3, calculating a deviation between a measured voltage and a preset voltage of a central bus in the reactive power and voltage control subregion;

S4, comparing the deviation with a control dead band threshold;

S5, establishing a reactive power tracking model according to the plurality of plant-plant coordination groups, and obtaining first reactive power adjustments of the generators in the reactive power and voltage control subregion according to the reactive power tracking model, if the deviation is greater than the control dead band threshold;

S6, establishing a reactive power keeping model according to the plurality of plant-plant coordination groups, the first generator set and the second generator set, and obtaining second reactive power adjustments of the generators in the reactive power and voltage control subregion according to the reactive power keeping model;

S7, obtaining sum reactive power adjustments of the generators in the reactive power and voltage control subregion according to the second reactive power adjustments, or according to the first reactive power adjustments and the second reactive power adjustments, and obtaining voltage adjustments of high voltage side buses of the plurality of power plants according to the sum reactive power adjustments to control voltages of the high voltage side buses; and S8, sending each voltage adjustment to a corresponding power plant as a voltage control instruction to perform the reactive and voltage control.

* * * * *